Dec. 16, 1924.   1,519,476
N. T. BACON
APPARATUS FOR RECOVERING MIXED SALTS FROM SOLUTION
Original Filed Dec. 27, 1919
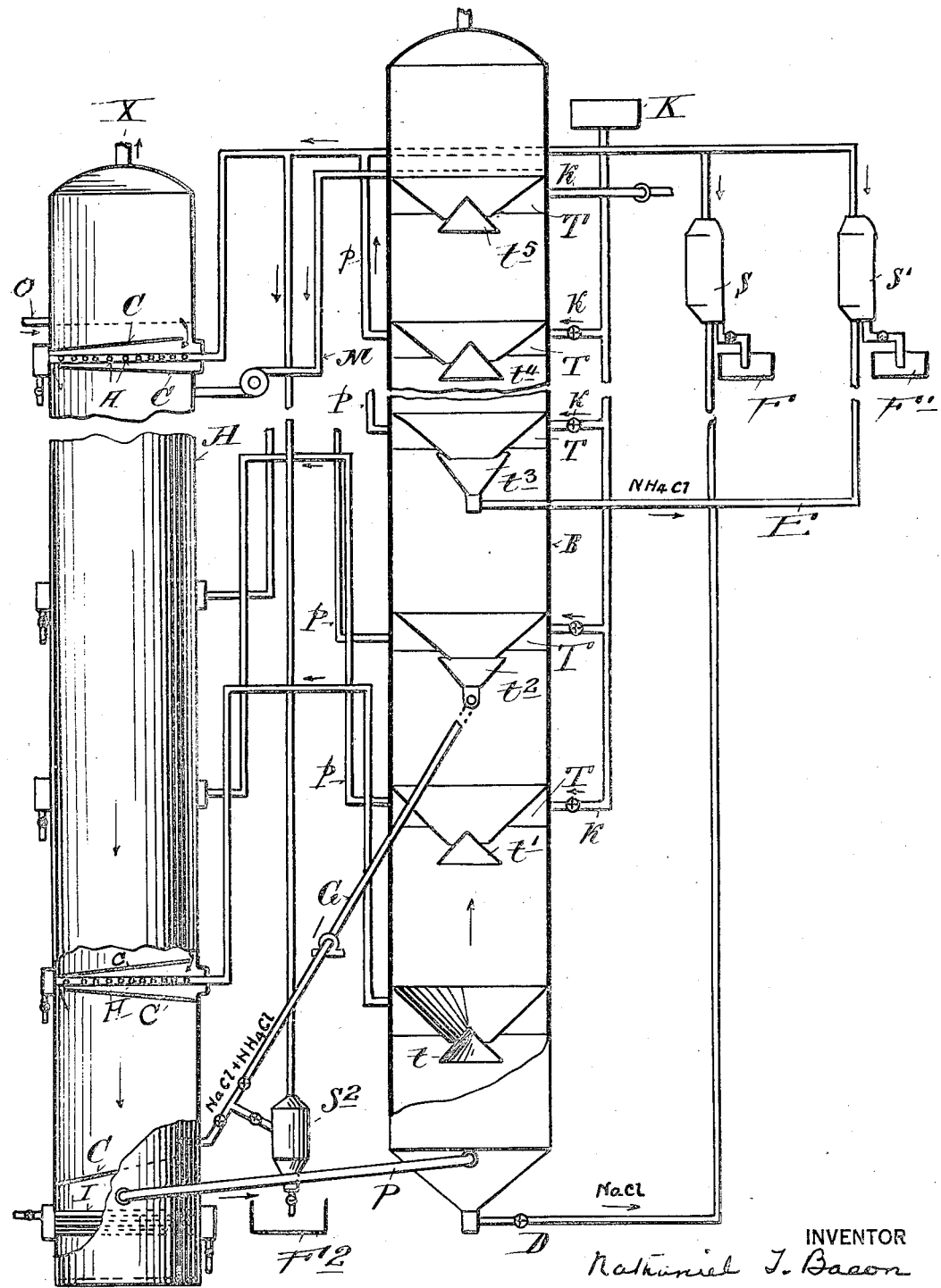
INVENTOR
Nathaniel T. Bacon
BY his ATTORNEY
Clarkson A. Collins.

Patented Dec. 16, 1924.

1,519,476

UNITED STATES PATENT OFFICE.

NATHANIEL TERRY BACON, OF PEACE DALE, RHODE ISLAND, ASSIGNOR TO THE SOLVAY PROCESS COMPANY, OF SOLVAY, NEW YORK, A CORPORATION OF NEW YORK.

APPARATUS FOR RECOVERING MIXED SALTS FROM SOLUTION.

Original application filed December 27, 1919, Serial No. 347,832. Divided and this application filed April 7, 1922. Serial No. 550,340.

*To all whom it may concern:*

Be it known that I, NATHANIEL T. BACON, a citizen of the United States, residing at Peace Dale, in the county of Washington and State of Rhode Island, have invented a new and useful Apparatus for Recovering Mixed Salts from Solution, of which the following is a specification.

My invention relates particularly to the recovery of ammonium chlorid from the mother liquors of the ammonia soda process, in which it is contained, together with varying quantities of sodium chloride and carbonate of ammonia, but practically free from other impurities.

The recovery of the ammonium chlorid by boiling down the mother liquor is a matter of extreme difficulty, because of the dissociation of ammonium chlorid after the free ammonia has been driven off and the consequent destructive corrosion of metallic surfaces, especially the heating pipes. Such part of the $NH_4Cl$ as does not break up tends to adhere to the heating tubes and thus reduce their efficiency to a small fraction of that of clean tubes.

The object of my improvements is to avoid these difficulties and at the same time provide for the separate recovery of the ammonium chlorid and sodium chlorid contained in the liquor treated. The invention will be best understood by reference to the accompanying drawing, which is a diagrammatic representation of an organization of apparatus which may be used for carrying the invention into effect.

Referring to the drawing, A, B, represent two towers located in operative relation, in the former of which the liquor to be treated is preheated, and in the latter is evaporated, so as to effect crystallization and precipitation of the contained salts. The preheating of the liquor in the preheating tower A, is effected by steam generated in the evaporating tower, B, and collected under steam traps, T, T, whence it passes by pipe $p, p$, to heating tubes or coils H, located at corresponding levels in the tower, A. The tower, A, is provided with baffles, C, C, to prevent as far as possible convection currents therein, and so arranged as, at the same time, to permit gases set free in the liquor to pass to the top of the tower.

The lower part of the tower, A, is connected with that of the tower, B, by a pipe P. The liquor at the bottom of the tower, B, is raised to the boiling point under the pressure of the column of liquor therein by means of live steam passing through a nest of heating pipes, I, located below the lowest baffle in the tower, A. The bottom of the tower, B, is located somewhat above the level of the heating tubes, I, so that the pressure of the column of liquid in the tower, A, is enough greater than that in the tower, B, to prevent boiling of the liquor in the tower, A, when the liquor in the lower part of the tower, B, is raised to the boiling point under the existing pressure.

The operation of the device is as follows:— The liquor to be treated is admitted through pipe, O, to the preheating tower, A, and passes downward therethrough, being heated in its passage by steam from the steam traps, T, in the evaporating tower, B. In the preheater, A, a large part of the free ammonia and the $CO_2$ in the liquor are driven off and bubble up past the baffles, C. These gases will gradually accumulate in the feed at the top of the tower until they raise the strength of ammonia and $CO_2$ in the feed to a point at which very rich gas will be given off at the exit, X, at the top of the tower from which these gases can be carried back for use in the ammonia soda system, or they can be utilized in making commercial carbonate of ammonia, or otherwise, as desired. Enough free ammonia will, however, remain in the liquor in the preheater A, to prevent dissociation of ammonium chloride therein.

The continuous feed of liquor by pipe, O, to the upper part of tower, A, causes a continuous flow of liquor downward through tower A, and thence past the heating tubes, I, through pipe, P, to the bottom of tower, B, and upward therethrough.

As the preheated liquor enters the evaporating tower, B, it has been heated to the boiling point at this level by steam in the heating tubes, I, located at the base of the tower, A. There will, however, be no fouling of these tubes since there is no precipitation of salts at this point. As the liquor flows into the base of the evaporating tower, B, it is not saturated with any salt, as both NaCl and NH₄Cl increase in solubility by heating, and the only other salt present, which is a small amount of $Na_2SO_4$, existing as an impurity, can be kept below saturation at all times by bleeding off from time to time a portion of the mother liquor.

As the liquor enters the evaporating tower, B, it will meet crystals of NaCl falling from the upper levels, and will saturate itself therewith at once, so that it will immediately begin to throw down NaCl as it boils, but it will still be below saturation with $NH_4Cl$, the solubility of which increases rapidly with increasing temperature.

The NaCl precipitated in the bottom of the tower, B, is drawn off, as through pipe, D, by means of a steam aspirator, S, to filter F. It will be free from $NH_4Cl$ except for adhering mother liquor which can be removed by washing.

In the upper portion of the evaporating tower, B, $NH_4Cl$ only will be precipitated, since the rapidly decreasing temperature, due to relief of pressure, will throw down $NH_4Cl$ far more rapidly than the precipitation caused by concentration of the solution, and the solubility of NaCl is increased so much by removal of $NH_4Cl$ from solution that the solution as it approaches the top of the column recedes more and more from saturation with NaCl. The precipitated $NH_4Cl$ is caught in an inverted cone, $t^3$ and carried off by steam aspirator, S', to a filter F'. Between the zones in which NaCl, and $NH_4Cl$ are separately precipitated, both salts are precipitated together and these mixed salts are received in an inverted cone, $t^2$, located at such a point that none of the mixed salts will pass down into that portion of the tower in which NaCl alone is precipitated. This point will ordinarily be at about one fourth the distance from the bottom of the tower, though this will vary with variations in the amount of NaCl in solution. The mixed salts collected in the inverted cone, $t^2$, may be carried by pipe, G, and steam aspirator $S^2$ to a filter, $F^2$, or they may be delivered directly into the preheating tower, A, at a point near the bottom thereof where they will redissolve as the solution is saturated with neither salt at this point.

The small amount of free ammonia remaining in the liquor as it enters the tower, B, will be driven off in the lower part of the tower and will pass over in the steam from the lowermost of the traps, T, and will condense with the steam and be drawn off in the drip from which it can be recovered by distillation.

Any danger of destruction of the pipes by chlorine set free by dissociation of $NH_4Cl$ above this point may be obviated by admitting ammonia to the tower, B, as from a tank, K, through pipes $k, k$. The excess ammonia will, as above stated, pass over with the steam and be collected in and recovered from the drip.

As the liquor passes upward through the tower, B, it will continue to boil under reducing pressure and with decreased temperature. The steam generated, and collected under the traps, T, passes over to the heating tubes of corresponding level in the preheating tower, A, until a point is reached where the steam temperature is so near that of the liquor surrounding the condensing tubes that it will not be condensed by the feed in the tower, A. The steam from the traps above this point, as well as that from the top of the tower, B, is drawn off and condensed by means of vacuum pumps and cold water condensers (not shown in the drawing) as in the ordinary vacuum processes. The unevaporated liquor is returned from the top of the tower B, as by pipe M, to tower, A, where it is mixed with fresh feed.

By means of my invention I am able to recover the ammonium chloride content of mother liquor of the ammonia soda process uncontaminated with other salts, and without injury to the apparatus employed, the advantages of which will be readily apparent to those skilled in the art.

I do not claim herein the process described, the same having been claimed in an application for Letters Patent filed December 27th, 1919, Serial No. 347,832, which has matured into Patent 1,416,772, May 23, 1922, of which this application is a division.

What I do claim as new and desire to secure by Letters Patent is:—

1. In an apparatus for separately recovering mixed salts from a solution thereof the combination of a continuous, vertically elongated evaporating tower, separate means for heating the solution, means for causing a continuous upward flow of heated solution of progressively decreasing temperature through said tower and a series of collecting devices disposed one above the other in said tower and arranged to permit a continuous flow of solution through said tower and to separately collect the salts precipitated therein at different temperatures.

2. In an apparatus for separately recovering mixed salts from a solution thereof the combination of a preheating tower, a continuous, vertically elongated evaporating tower connected therewith, means for causing a downward flow of solution of progressively increasing temperature through the preheating tower, means for causing an upward flow of solution of progressively decreasing temperature through the evaporating tower and a series of collecting devices vertically disposed one above the other in the evaporating tower and arranged to permit a continuous flow of solution through said tower and to separately collect the several salts precipitated at different temperatures therein.

3. In an apparatus for separately recovering mixed salts from a solution thereof the combination of a preheating tower, an evaporating tower connected therewith, means for causing a downward flow of solution of progressively increasing temperature through the preheating tower, means for causing an upward flow of solution of progressively decreasing temperature through the evaporating tower, a series of collecting devices vertically disposed one above the other in the evaporating tower for separately collecting the several salts, a collector in the evaporating tower arranged to collect mixed salts and means for returning the mixed salts from such collector to the preheating tower.

4. In an apparatus for separately recovering mixed salts from a solution thereof the combination of a preheating tower and means for causing a downward flow of solution therethrough, a continuous, vertically elongated evaporating tower connected therewith, means for causing a flow of solution from the preheating tower to the evaporating tower, means for causing an upward flow of solution through the evaporating tower, means for heating the solution in the preheating tower from the top downward with steam at progressively higher temperatures evolved in the evaporating tower and a series of collecting devices vertically disposed one above the other in the evaporating tower and arranged to permit a continuous flow of solution through said tower and to separately collect the several salts precipitated at different temperatures therein.

5. In an apparatus for separately recovering mixed salts from a solution thereof the combination of a preheating tower and means for causing a downward flow of solution therethrough, a continuous vertically elongated evaporating tower connected therewith, means for causing a flow of solution from the preheating tower to the evaporating tower, means for causing an upward flow of the solution through the evaporating tower, means for separating steam at successive points in the evaporating tower, means for utilizing the steam generated in the evaporating tower to progressively heat the liquid in the preheating tower from the top downward and a series of collecting devices vertically disposed, one above another in the evaporating tower and arranged to permit a continuous flow of solution through said tower and to separately collect the several salts precipitated at different temperatures therein.

In testimony whereof I affix my signature, this 1st day of April 1922.

NATHANIEL TERRY BACON.